United States Patent
Takasugi

[19]

[11] Patent Number: 5,978,177
[45] Date of Patent: Nov. 2, 1999

[54] MAGNETIC HEAD SUSPENSION COMPRISING A FLEXURE BONDED TO A LOAD BEAM VIA A FLEXIBLE RESIN

[75] Inventor: Satoru Takasugi, Kyoto, Japan

[73] Assignee: Suncall Corporation, Japan

[21] Appl. No.: 08/861,008

[22] Filed: May 21, 1997

[30] Foreign Application Priority Data

Jan. 16, 1997 [JP] Japan ..................................... 9-005500

[51] Int. Cl.⁶ ....................................................... G11B 5/48
[52] U.S. Cl. ............................................................ 360/104
[58] Field of Search ............................ 360/97.01, 98.01, 360/104–106, 108

[56] References Cited

U.S. PATENT DOCUMENTS

| | | | |
|---|---|---|---|
| 5,657,186 | 8/1997 | Kudo et al. | 360/104 |
| 5,666,717 | 9/1997 | Matsumoto et al. | 29/603.12 |
| 5,680,274 | 10/1997 | Palmer | 360/104 |
| 5,696,651 | 12/1997 | Endo et al. | 360/104 |
| 5,699,212 | 12/1997 | Erpelding et al. | 360/104 |
| 5,701,218 | 12/1997 | Boutaghou | 360/104 |
| 5,717,547 | 2/1998 | Young | 360/104 |
| 5,737,152 | 4/1998 | Balakrishnan | 360/104 |
| 5,739,982 | 4/1998 | Arya et al. | 360/104 |
| 5,786,961 | 7/1998 | Goss | 360/104 |
| 5,815,348 | 9/1998 | Danielson et al. | 360/104 |

*Primary Examiner*—Jefferson Evans
*Attorney, Agent, or Firm*—Chrisman, Bynum & Johnson

[57] ABSTRACT

The invention provides a magnetic head suspension of an integrated wiring arrangement type which has an increased mechanical property and which may be produced at high yield efficiency. The invention eliminates bowing or warping from stainless steel plate subsequently constituting load beam or flexure, by obviating the step of unwinding or winding stainless steel plate. In a magnetic head suspension according to the invention, a flexure 2, having a thickness less than that of a load beam 1 and a rigidity less than that of the load beam 1, is bonded to one surface of the load beam 1, having a predetermined rigidity, through a bonding layer 14 of a flexible resin. An insulation layer 71 of a flexible resin is formed on the surface of the flexure 2 opposite to the surface facing to the load beam 1. The insulation layer 71 extends from the proximal end portion of the flexure 2 to the distal end portion of the flexure 2. A wiring arrangement 4 is formed on the insulation layer 71. The wiring arrangement 4 is connected to a magnetic head slider disposed at the distal end portion of the flexure 2.

8 Claims, 11 Drawing Sheets

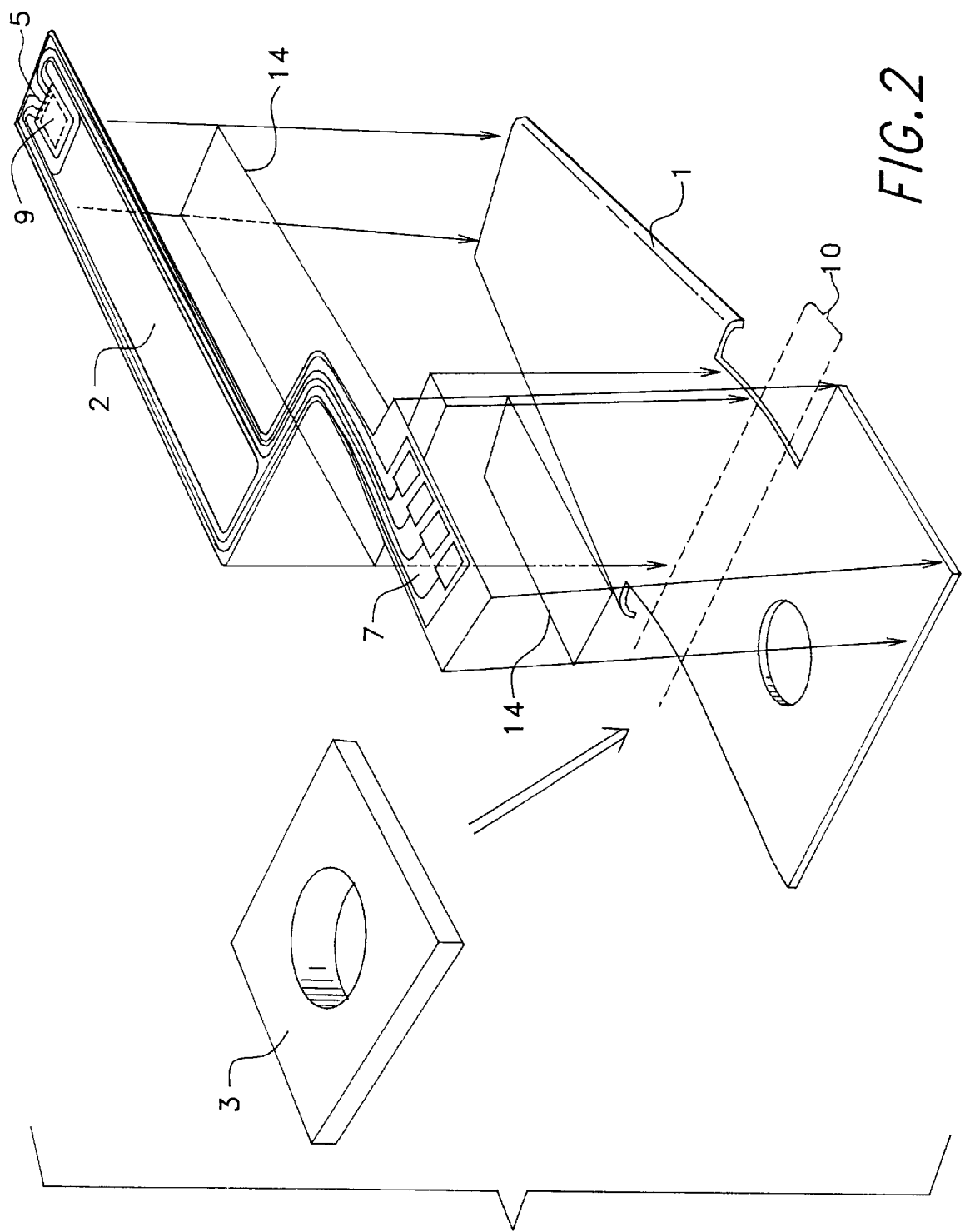

MAGNETIC HEAD SUSPENSION COMPRISING A FLEXURE BONDED TO A LOAD BEAM VIA A FLEXIBLE RESIN

FIELD OF THE INVENTION

This invention relates to a magnetic head suspension and a method for producing the same. Specifically, the invention relates to a magnetic head suspension of an integrated wiring arrangement type in which a bonding layer of a flexible resin is disposed between a load beam and a flexure.

BACKGROUND OF THE INVENTION

In a magnetic head suspension employed in a conventional hard disk drive (HDD), lead wires are used as a wiring arrangement to be connected to a magnetic head slider. It is noted, however, that, in recent hard disk drives (HDD), densification of recording density and miniaturization of units are quickly proceeded. Accordingly, the magnetic head slider is also miniaturized. By this, miniaturization and lowering load are also required for a magnetic head suspension serving as a plate spring for supporting a magnetic head slider used in HDDs. It is noted, however, that rigidity of lead wires disposed on the suspension becomes not negligible in accordance with reduction in load of such magnetic head suspension. Such rigidity may influence on the floating property of the magnetic head slider.

Under the circumstances, a suspension of an integrated wiring arrangement type is developed, in which a metal layer integrally formed with the suspension, rather than lead wires, is used as a wiring arrangement to be connected to the magnetic head slider.

FIG. 13 illustrates such suspension of an integrated wiring arrangement type. The suspension includes a load beam 1 and a flexure 2. A wiring arrangement 4 to be connected to a magnetic head slider (not shown) is integrally formed with the flexure 2. Specifically, the magnetic head suspension includes a load beam 1 of stainless steel having a thickness of 60–70 micrometers a flexure 2 of stainless steel having a thickness of 20–30 micrometers, and a base plate 3 of stainless steel having a thickness of 300 micrometers. The flexure 2 is spot-welded at a plurality of welds W to the load beam 1. The base plate 3 is also connected to the load beam 1 by welding. As shown in FIGS. 13 to 15(*a*), (*b*), (*c*), a polyimide layer 7 is formed on the upper surface of the flexure 2, i. e., on the surface of the flexure 2 opposite to the surface facing the load beam 1. Within the polyimide 7, wiring arrangement 4 of Cu (copper) having a thickness of about 5–10 micrometers, and pads 5 and 6 are formed. The magnetic head slider is attached to the flexure 2 at its distal region 9, and the terminal of the magnetic head slider is electrically connected to the pad 5.

FIG. 14 is a perspective view illustrating the suspension shown in FIG. 13 which has been disassembled into three parts, i. e., the load beam 1, the flexure 2 and the base plate 3. The magnetic head slider is adhesively attached to the region 9 to which it is to be attached. A load is applied to the magnetic head slider in the direction toward a disk, i.e.,in the vertical direction. Thus, the distal region of the load beam 1 adjacent to the base plate 3 is narrowed in a region of load bending 10 so as to have a predetermined resiliency, and is also bent into a predetermined configuration.

The sections respectively along line A—A, B—B and C—C in FIG. 13 are respectively shown in FIGS. 15(*a*), 15(*b*) and 15(*c*). As shown in these drawings, the polyimide layer 7 consists of an insulation layer 71 of polyimide having a thickness of 5–10 micrometers for providing electrical insulation between the wiring arrangement 4 and the flexure 2, and a protective layer 72 of polyimide having a thickness of 3–10 micrometers for covering the wiring arrangement 4 for protection thereof. It is noted that, as shown in FIG. 15(*c*), the protective layer of polyimide 72 has openings P disposed over the pads 6. Thus, the surface made of Cu of each of the pads 6 is exposed through a respective opening P. The protective layer 72 of polyimide disposed on the pad 5 has the same construction, although not specifically shown. The Cu surface of each of the pads 5 and 6 is often provided with Ni/Au plating, although not specifically shown.

A method for producing a magnetic head suspension according to prior art will be explained below.

FIGS. 16(*a*) to 16(*e*) are sectional views sequentially showing such production method. As shown in FIG. 16(*a*), an insulation film 171 of polyimide having a thickness of 5–10 micrometers and a Cu (copper) film 104 having a thickness of 5–10 micrometers are sequentially laminated on a stainless steel plate 102 having a thickness of 20–30 micrometers, subsequently constituting the flexure, in its entire surface. Then, a resist 11 is formed on the Cu film 104 in its wiring forming region. Thereafter, and as shown in FIG. 16(*b*), the Cu film 104 is etched away using the resist 11 as a mask, so as to form Cu wiring arrangement 4. Then, the resist 11 Is etched away , for example, by means of an organic solvent. Thereafter, and as shown in FIG. 16(*c*), a resist 12 is formed on the insulation film 171 of polyimide including the area where the Cu wiring arrangement 4 is formed. Then, the insulation film 171 of polyimide is etched away by means of hydrazine, for example, using the resist 12 as a mask.

The resist 12 is removed using an organic solvent, for example. Thereafter, and as shown in FIG. 16(*d*), photosensitive polyimide is applied on the entire surface. Then, exposure and development are performed so as to form the protective layer 72 of polyimide for covering the wiring 4. It is also possible to form the protective layer 72 of polyimide using non-photosensitive polyimide. It is noted, however, that, in such a case, a series of additional steps is required, such as application of non-photosensitive polyimide on the entire surface, formation of mask on the polyimide layer by means of resist, etching of the polyimide layer, and removal of the resist. Such series of additional steps may be obviated when the above-mentioned photosensitive polyimide is used, so that the process is simplified.

When the protective layer 72 of polyimide has been formed, a resist pattern 13 is formed on the opposite surfaces of the stainless steel plate 102 (subsequently constituting the flexure 2), as shown in FIG. 16(*e*). The stainless steel plate 102 is etched away using the above resist patterns 13, 13 as a mask, so as to form the flexure 2. Subsequently, the lower resist pattern 13 is removed using an organic solvent, for example. Thereafter, the flexure 2 is welded to the load beam 1. Then, the base plate 3 is welded to the load beam 1. The load beam 1 is further bent into a predetermined configuration, so that the magnetic head suspension shown in FIG. 15(*a*) is obtained.

In the conventional magnetic head suspension just mentioned above, the flexure 2 is attached to the load beam 1 by means of welding. Thus, strain due to the welding operation is introduced into the load beam 1 and the flexure 2. Accordingly, mechanical property (specifically, variation in the attitude angle of the flexure 2 at the region 9 where the magnetic head slider is attached thereto, and rigidity) of the load beam 1 and the flexure 2 is degraded, whereby reliability is reduced.

In the conventional method for producing a magnetic head suspension, the polyimide layer 7 and the Cu wiring 4 are formed on the stainless steel plate 102 which has been thinned to have a thickness of 20–30 micrometers in order to increase floating property of the magnetic head slider. Thus, the stainless steel plate 102 is easily deformed during the step of forming the polyimide layer 7 and the Cu wiring 4, whereby production yield is decreased.

According to prior art, and in order to stably perform various processes, such as photolithography, etching or the like relative to the thin stainless steel plate 102, the stainless steel plate is wound around a roll. The stainless steel plate is continuously unwound from the roll onto an equipment of each of the above-mentioned processes. The stainless steel plate output from each equipment is again wound around a roll each time after each process has been completed. In this connection, it is to be noted that, when the stainless steel plate 102 is wound around a roll, bowing or warping may be remained in the flexure 2 which has been formed by etching away the stainless steel 102. Thus, mechanical property of the flexure 2 is decreased (specifically, variation in the attitude angle of the flexure is increased), so that production yield is disadvantageously decreased.

It is further noted that each step or process requires a roll equipment in order to perform the unwinding and winding operations of the stainless steel plates this essentially requires a large production line. Equipment for transferring the stainless steel plate in rolled form is required between each process, so that the length of production line is also increased.

SUMMARY OF THE INVENTION

In view of the above-mentioned problems experience in prior art, the invention is aimed at provision of a magnetic head suspension of an integrated wiring arrangement type having an increased mechanical property. The invention is also aimed at provision of a method for producing a magnetic head suspension of the above-mentioned type with high yield efficiency. The invention is further aimed at making the production line to be compact, by obviating the processes of unwinding and winding the stainless steel plate.

A magnetic head suspension according to one embodiment of the invention is featured by comprising a load beam having a predetermined rigidity; a flexure bonded to one surface of the load beam through a bonding layer of a flexible resin, the flexure having a thickness less than that of the load beam and a rigidity less than that of the load beam; a insulation layer of a flexible resin formed on the surface of the flexure opposite to the surface thereof through which the load beam is bonded to the flexure, the insulation layer extending in the direction from the proximal end to the distal end of the flexure; and a wiring arrangement formed on the insulation layer and connected to a magnetic head slider disposed at the distal portion of the flexure.

It is preferable that the bonding layer be formed only in an area wherein said load beam and said flexure are overlapped with each other.

A method for producing a magnetic head suspension according to the invention is featured by comprising the steps of: laminating a bonding layer of a flexible resin and a second metal plate for a flexure in sequence on the entire upper surface of a first metal plate for a load beam; forming an insulation layer of a flexible resin and wiring arrangement to be connected to a magnetic head slider in sequence on the second metal plate in its wiring arrangement forming area; forming a resist pattern on the second metal plate in its flexure forming area, including the wiring arrangement, and etching away the second metal plate using the resist pattern as a mask, so as to form a flexure; etching away the bonding layer of a flexible resin using the flexure as a mask; and forming a resist pattern on the lower surface of the first metal plate in its area where the load beam is to be formed, when the upper surface of the first metal plate on which the flexure has been formed, together with the flexure, is entirely masked by means of a resist, and etching away the first metal plate using the resist pattern as a mask, so as to form the load beam.

A method for producing a magnetic head suspension according to the invention is featured by comprising the steps of: laminating a bonding layer of a flexible resin and a second metal plate for a flexure in sequence on the entire upper surface of a first metal plate for a load beam; forming an insulation layer of a flexible resin and wiring arrangement to be connected to a magnetic head slider in sequence on the second metal plate in its wiring arrangement forming area; forming a resist pattern on the second metal plate in its flexure forming area, including the wiring arrangement, and etching away the second metal plate using the resist pattern as a mask, so as to form a flexure; forming a resist pattern on the lower surface of the first metal plate in its area where the load beam is to be formed, when the upper surface of the first metal plate on which the flexure has been formed, together with the flexure, is entirely masked by means of a resist, and etching away the first metal plate using the resist pattern as a mask, so as to form the load beam; and etching away the bonding layer of a flexible resin using the load beam having been formed by the etching process as a mask, so as to cause the bonding layer to be remained only in the area wherein the load beam and the flexure are overlapped with each other.

A method for producing a magnetic head suspension according to the invention is featured by: in the step of forming the insulation layer and the wiring arrangement on the second metal plate, laminating a flexible resin film subsequently constituting the insulation layer and a metal film subsequently constituting the wiring arrangement in sequence on the entire surface of the second metal plate, then, etching away the metal film for the wiring arrangement, excluding the wiring arrangement forming area, so as to form the wiring arrangement, and etching away the flexible resin film, excluding the area of the wiring arrangement and the area adjacent thereto, so as to form the insulation layer.

A magnetic head suspension according to the invention is featured by comprising: a load beam having a predetermined rigidity; a flexure bonded to one surface of the load beam through a bonding layer of a flexible resin, the flexure having a thickness less than that of the load beam and a rigidity less than that of the load beam; a insulation layer of a flexible resin formed on the surface of the flexure opposite to the surface thereof through which the load beam is bonded to the flexure, the insulation layer extending in the direction from the proximal end to the distal end of the flexure; a feed layer of metal formed on the insulation layer; and a wiring arrangement formed into a predetermined pattern on the feed layer by means of masking and electrolytic plating using the feed layer as an electrode, the wiring arrangement being connected to a magnetic head slider disposed at the distal end portion of the flexure.

A method for producing a magnetic head suspension according to the invention is featured by comprising the steps of: laminating a bonding layer of a flexible resin and a second metal plate for a flexure in sequence on the entire upper surface of a first metal plate for a load beam; forming an insulation layer of a flexible resin and a feed layer of metal in sequence on the second metal plate in its wiring arrangement forming area; forming a wiring pattern to be connected to a magnetic head slider on the feed layer by means of a resist; thickening the feed layer exposed from the resist in a wiring pattern with electrically conductive metal by means of electrolytic plating; removing the resist on the feed layer; etching away the feed layer excluding the area of wiring arrangement using the thickened wiring arrangement as a mask; forming a resist pattern on the second metal plate in its flexure forming area, including the wiring arrangement, and etching away the second metal plate using the resist pattern as a mask, so as to form a flexure; etching away the bonding layer of a flexible resin using the flexure as a mask; and forming a resist pattern on the lower surface of the first metal plate in its area where the load beam is to be formed, when the upper surface of the first metal plate on which the flexure has been formed, together with the flexure, is entirely masked by means of a resist, and etching away the first metal plate using the resist pattern as a mask, so as to form the load beam.

A method for producing a magnetic head suspension according to the invention is featured by comprising the steps of; laminating a bonding layer of a flexible resin and a second metal plate for a flexure in sequence on the entire upper surface of a first metal plate for a load beam; forming an insulation layer of a flexible resin and a feed layer of metal in sequence on the second metal plate in its wiring arrangement forming area; forming a wiring pattern to be connected to a magnetic head slider on the feed layer by means of a resist; thickening the feed layer exposed from the resist in a wiring pattern with electrically conductive metal by means of electrolytic plating; removing the resist on the feed layer; etching away the feed layer excluding the area of wiring arrangement using the thickened wiring arrangement as a mask; forming a resist pattern on the second metal plate in its flexure forming area, including the wiring arrangement, and etching away the second metal plate using the resist pattern as a mask, so as to form a flexure; forming a resist pattern on the lower surface of the first metal plate in its area where the load beam is to be formed, when the upper surface of the first metal plate on which the flexure has been formed, together with the flexure is entirely masked by means of a resist, and etching away the first metal plate using the resist pattern as a mask, so as to form the load beam; and etching away the bonding layer of a flexible resin using the load beam having been formed by the etching process as a mask, so as to cause the bonding layer to be remained only in the area wherein the load beam and the flexure are overlapped with each other.

BRIEF DESCRIPTION OF THE DRAWINGS

For a fuller understanding of the nature and objects of the present invention, reference should be had to the following detailed description taken in connection with the accompanying drawings wherein:

FIG. 2 is an exploded perspective view of the magnetic head suspension shown in FIG. 1;

DETAILED DESCRIPTION OF THE PREFERRED EMBODIMENTS

The invention will be explained below with reference to one embodiment of the invention.

Figure 1:
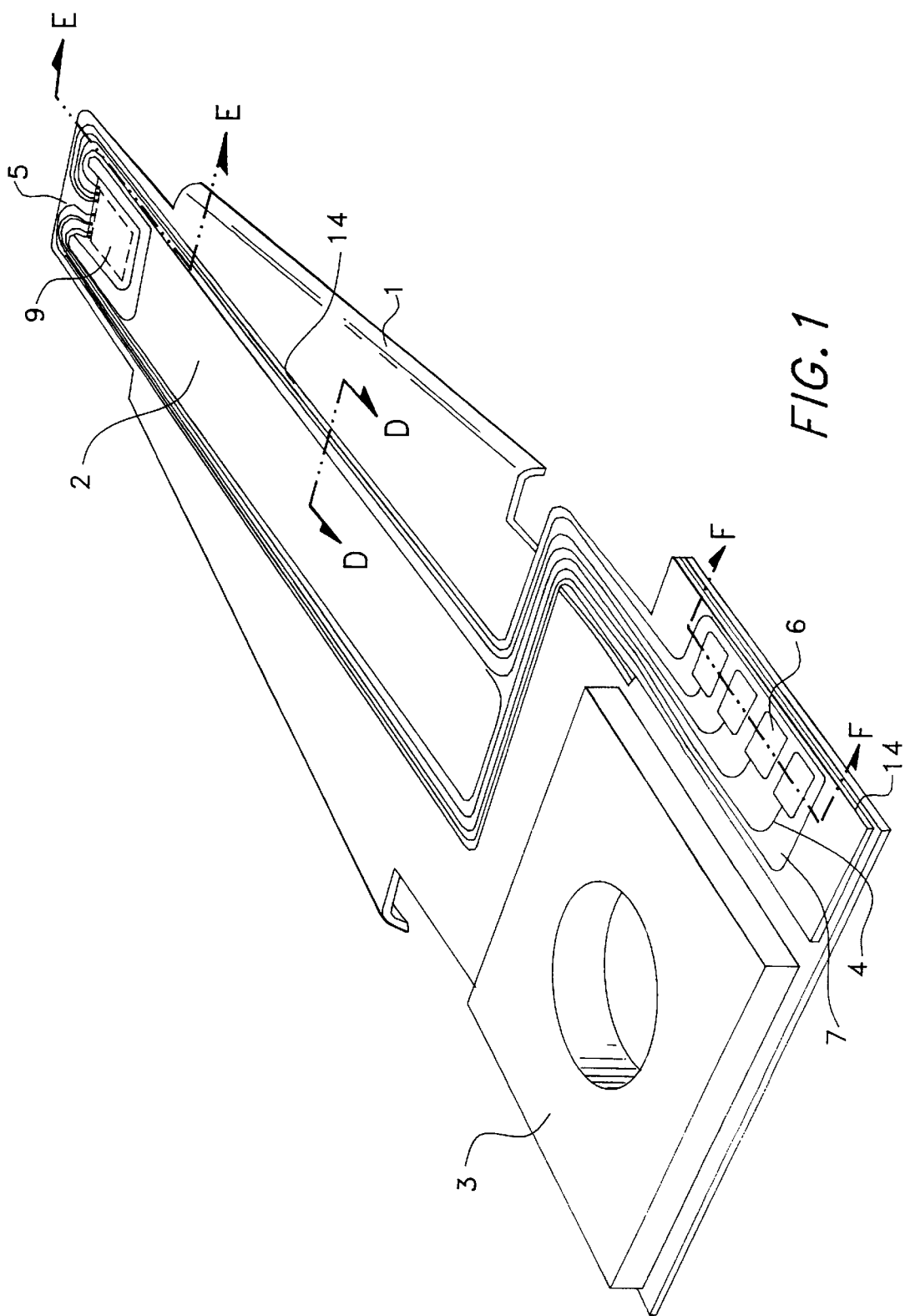
FIG. 1 is a perspective view illustrating a magnetic head suspension according to one embodiment of the invention.

FIG. 1 is a perspective view illustrating a magnetic head suspension according to one embodiment of the invention. FIG. 2 is a perspective view illustrating the magnetic head suspension disassembled into each part. As shown in FIGS. 1 and 2, the magnetic head suspension includes a load beam 1 formed from a stainless steel strip having a thickness of 60–70 micrometers, a flexure 2 formed from a stainless steel strip having a thickness of 20–30 micrometers, a base plate 3 formed from a stainless steel strip having a thickness of about 0.3 mm, and a bonding layer 14 formed from polyimide as a flexible resin. The flexure 2 is bonded to the load beam 1 through the bonding layer of polyimide.

The base plate 3 is bonded to the load beam 1 by means of welding. A polyimide layer 7 is formed on the upper surface of the flexure 2, i. e., on the surface of the flexure opposite to the surface facing to the load beam 1. Within the polyimide layer 7, a wiring arrangement 4 consisting of a plurality of Cu (copper) wire leads having a thickness of 5–10 micrometers, and pads 5 and 6 are provided. A magnetic head slider is attached to the flexure 2 at its distal region 9, and the terminals of the magnetic head slider are electrically connected to the pad 5.

Figure 3A:
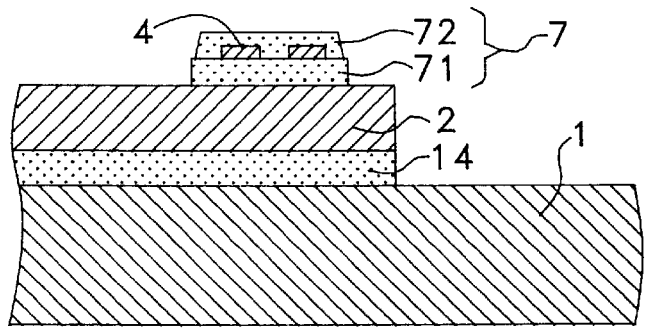
FIGS. 3(a), 3(b) and 3(c) are sectional views respectively along lines D—D, E—E and F—F of FIG. 1.
Figure 3B:
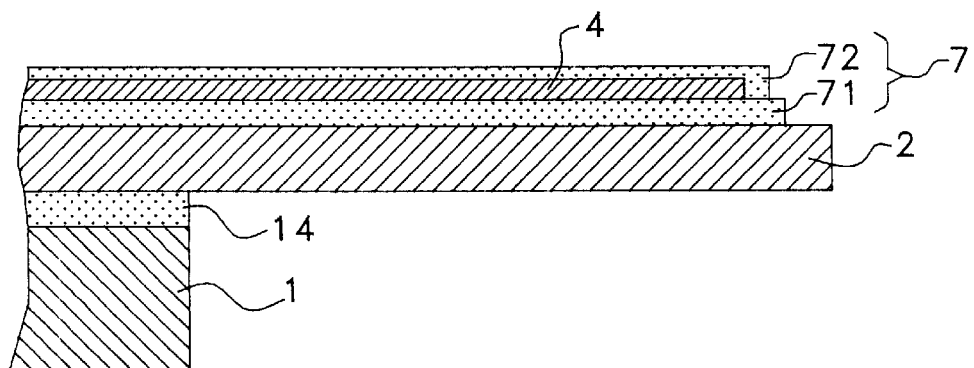
Figure 3C:
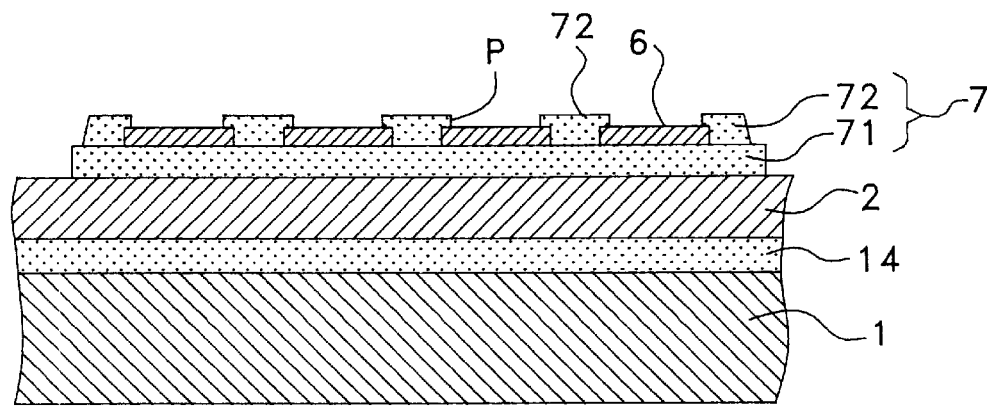

The sections respectively along line D—D, E—E and F—F of FIG. 1 are respectively shown in FIGS. 3(a), 3(b) and 3(c). As shown in FIGS. 3(a) to 3(c), the bonding layer 14 of polyimide is formed only in an area wherein the load beam 1 and the flexure 2 are overlapped with each other. The polyimide layer 7, as a flexible resin layer, consists of an insulation layer 71 of polyimide, having a thickness of 5–10 micrometers, for maintaining an electrical insulation relationship between the wiring arrangement 4 and the flexure 2, and a protective layer 72, having a thickness of 3–10 micrometers, for overlying the wiring arrangement 4 for the purpose of protecting the same. It is noted, however, that, as shown in FIG. 3(c), openings P of the protective layer 72 of polyimide are disposed over the pads 6, so that the surface of each of the pads 6 formed from Cu (copper) is exposed. The protective layer 72 of polyimide disposed on the pad 5 adjacent the magnetic head slider has the same construction. It is noted that a Ni/Au plating may be placed on the exposed Cu surface of each of the pads 5 and 6. By this, oxidation of the Cu surfaces may be prevented, and bonding of Au balls or Au wires to the pads 5 and 6 may be satisfactorily achieved.

In the configuration of the above-mentioned embodiment, the most significant feature of the invention resides in the fact that the bonding between the load beam 1 and the flexure 2 are achieved by the bonding layer 14 of a flexible resin, rather than welding. This prevents strain, otherwise caused when welding is used, from being introduced in the flexure 2 and the load beam 1. Thus, increased mechanical properties of the flexure 2 and the load beam 1 may be stably maintained. It is specifically noted that variation in attitude angle at the distal end of the flexure 2 may be reduced.

Figure 4:
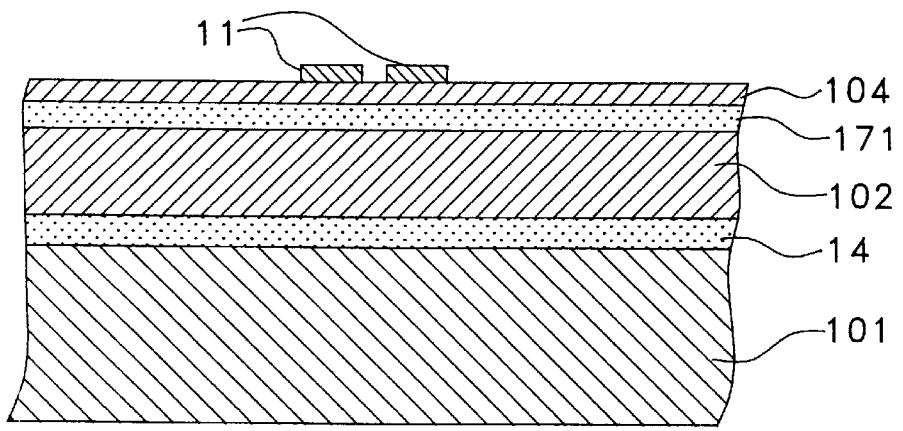
FIG. 4 is a sectional view illustrating a first step of a method for producing the magnetic head suspension shown in FIG. 1.

A method for producing the magnetic head suspension according to the above-mentioned embodiment of the invention will be explained below. FIGS. 4 to 11 are sectional views sequentially illustrating the steps of the method of the invention. First, and as shown in FIG. 4, a first metal plate 101 of a stainless steel plate having a thickness of 60–70 micrometers, which subsequently constitutes the load beam, is laminated, on its entire surface, sequentially with a bonding layer 14, having a thickness of 5–15 micrometers, of a polyimide resin, a second metal plate 102, having a thickness of 20–30 micrometers, of a stainless steel plate, which subsequently constitute the flexure, a insulation film 171, having a thickness of 5–10 micrometers, of polyimide, and a Cu (copper) film 104 having a thickness of 5–10 micrometers. Resists 11 are also formed on the Cu film 104 in the area wherein the wiring arrangement is formed.

Figure 5:
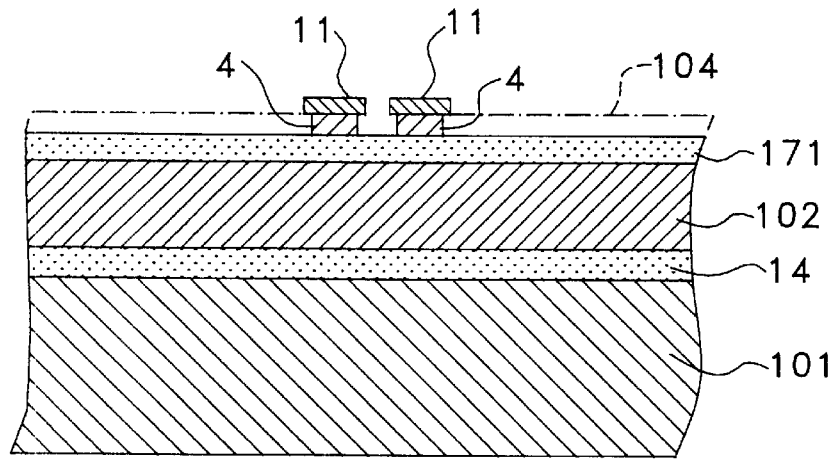
FIG. 5 is a sectional view illustrating a second stop of the method for producing the magnetic head suspension shown in FIG. 1.
Figure 6:
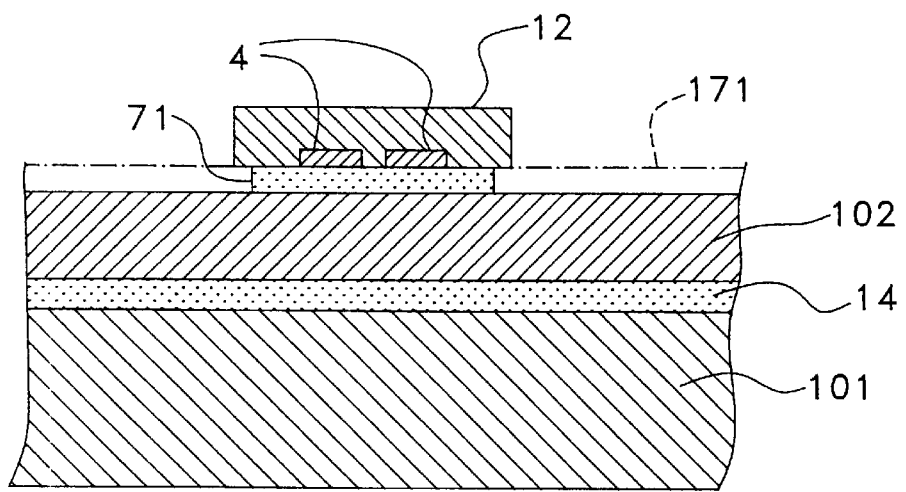
FIG. 6 is a sectional view illustrating a third step of the method for producing the magnetic head suspension shown in FIG. 1.

Then, and as shown in FIG. 5, the Cu film 104 is etched, for example, by a cupric chloride solution using the resists 11 as a mask. By this, Cu lead wires 4 are formed. The resists 11 are removed, for example, using an organic solvent. Thereafter, and as shown in FIG. 6, the area on the insulation film 171 of polyimide, including the region wherein the Cu lead wires are formed, are covered with a resist 12. Then, the insulation film 171 of polyimide is etched, for example, by a hydrazine solution using the resist 12 as a mask.

Figure 7:
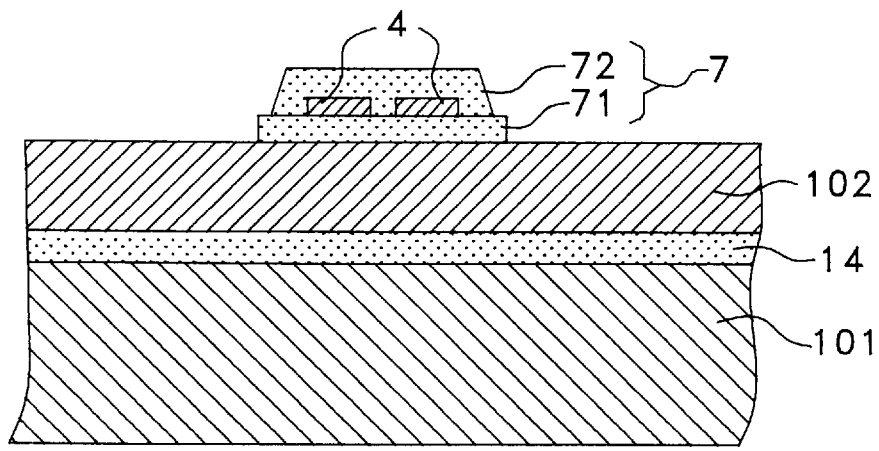
FIG. 7 is a sectional view illustrating a fourth step of the method for producing the magnetic head suspension shown in FIG. 1.
Figure 8:
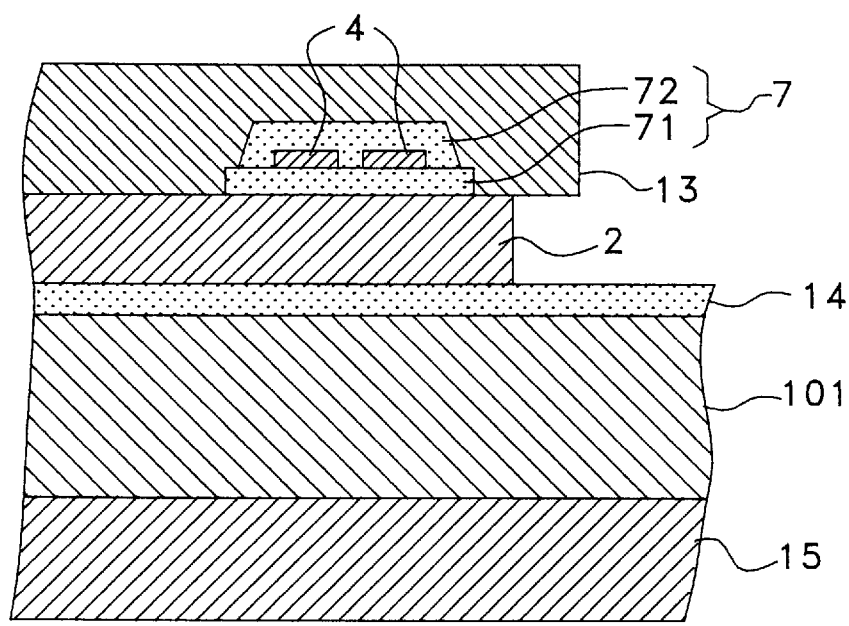
FIG. 8 is a sectional view illustrating a fifth step of the method for producing the magnetic head suspension shown in FIG. 1.

Then, the resist 12 is removed, for example, using an organic solvent. Thereafter, and as shown in FIG. 7, a photosensitive polyimide layer is applied over the entire surface. Then, exposure and development are performed so as to form a protection layer 72 of polyimide for covering the lead wires 4. Thereafter, and as shown in FIG. 8, a resist 15 is provided on the entire surface of the backside of the first metal plate 101 (subsequently constituting the load beat 1). A resist pattern 13 is formed on the upper surface of the second metal plate 102. When, the second metal plate (stainless steel plate) 102 is etched, for example, by a cupric chloride solution using the resist 15 and the resist pattern 13 as a mask, so as to for the flexure 2.

Figure 9:
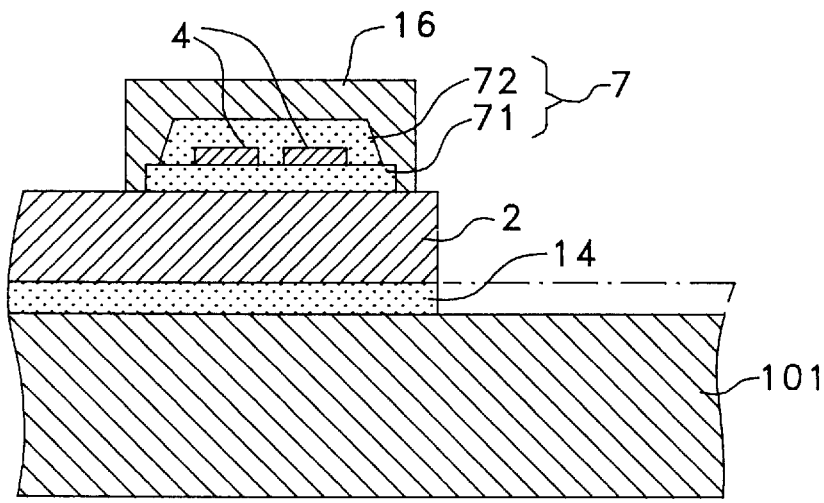
FIG. 9 is a sectional view illustrating a sixth step of the method for producing the magnetic head suspension shown in FIG. 1.
Figure 10:
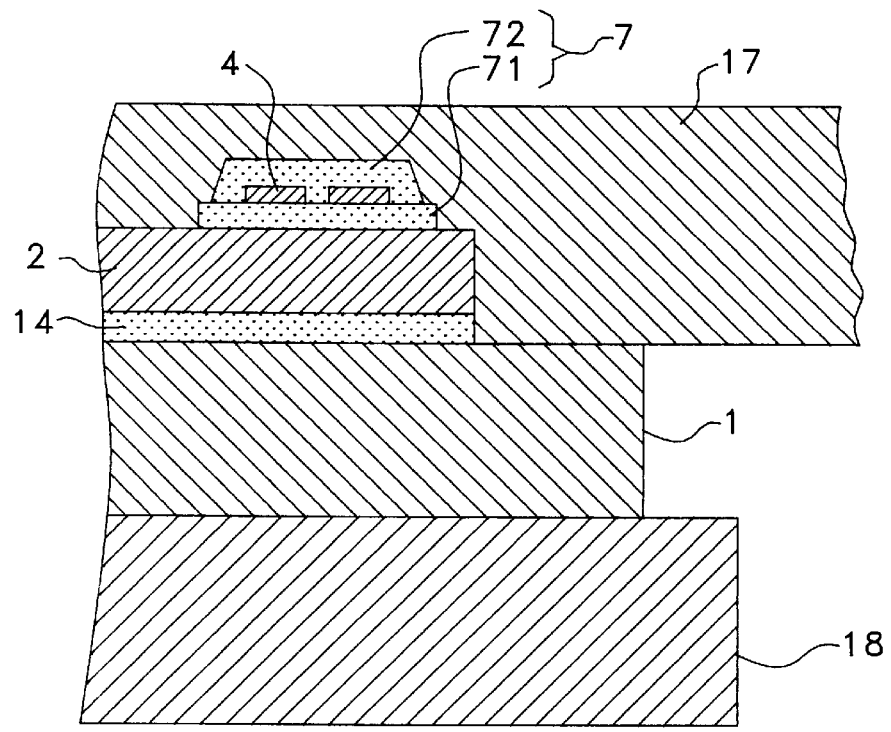
FIG. 10 is a sectional view illustrating a seventh step of the method for producing the magnetic head suspension shown in FIG. 1.

When the resists 13 and 15 have been removed, for example, by an organic solvent solution, a resist 16, for covering the insulation layer 71 of polyimide and the protective layer 72 of polyimide, is formed as shown in FIG. 9. Then, the bonding layer 14 of polyimide exposed on the first metal plate 101 is etched away, for example, by a hydrazine solution using the flexure 2 as a mask. When the resist 16 has been removed using an organic solvent, for example, a resist 17 is formed on the entire upper surface of the first metal plate (subsequently constituting the load beam 1) 101, for covering the flexure 2 in its entirety, as shown in FIG. 10. Then, a resist pattern 18 is formed on the lower surface of the first metal plate 101. Thereafter, the first metal plate 101 is etched away, for example, by a cupric chloride solution using the resist pattern 18 as a mask, so that the load beam 1 is formed.

Figure 11:
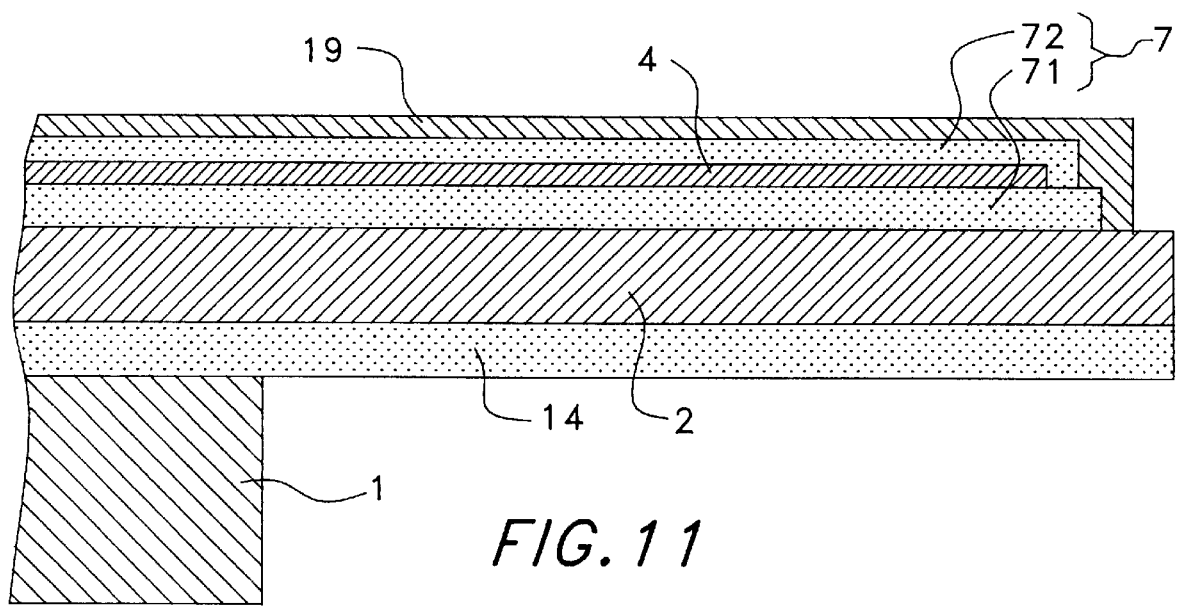
FIG. 11 is a sectional view illustrating a eighth step of the method for producing the magnetic head suspension shown in FIG. 1.

Then, and as shown in FIG. 11, the resist 17 is removed using an organic solvent. Thereafter, a separate resist 19 for covering the insulation layer 71 of polyimide and the protective layer 72 of polyimide is formed. Then, the bonding layer 14 of polyimide exposed on the lower surface of the flexure 2 is etched away, for example, by a hydrazine solution, using the load beam 1 as a mask.

Finally, the left-hand and right-hand opposite lateral edges of the load beam 1 are bent into a predetermined configuration and the base plate 3 is welded to the load beam 1. Thereafter, the load bending area 10 of the load beam 1 is bent into a predetermined configuration, whereby the magnetic head suspension shown in FIG. 1 is produced.

In the method for producing the magnetic head suspension according to one embodiment of the invention, formation of the Cu lead wires 4, formation of the polyimide layer 71 and formation of the flexure 2 are all performed on the first metal plate 101 having a thickness twice or more that of the flexure 2. Accordingly, it is possible to perform the various processes relative to the second metal plate 102, subsequently constituting the flexure, in a flattened form, without winding the second metal plate around a roll, as in the case of the prior art production method. Thus, the problem of bowing or warping of the flexure 2, which has been experienced in the prior art production method, may be prevented. By this, magnetic head suspensions of an increased mechanical property (specifically, variation in attitude angle is reduced) may be produced with a high yield percentage. It is also noted that no roll for winding therearound a metal plate is required in a production line and such production line may be configured in a simple and compact manner, so that cost of installation may be reduced.

The Cu lead wires 4 and the insulation layer 71 of polyimide may be formed by sequentially stacking such insulation layer and lead wires in a manner to be explained below, unlike the above-mentioned manner in which the insulation film 171 and the Cu film 104 laminated on the entire upper surface of the second metal plate 102 are etched away.

Figure 12A:
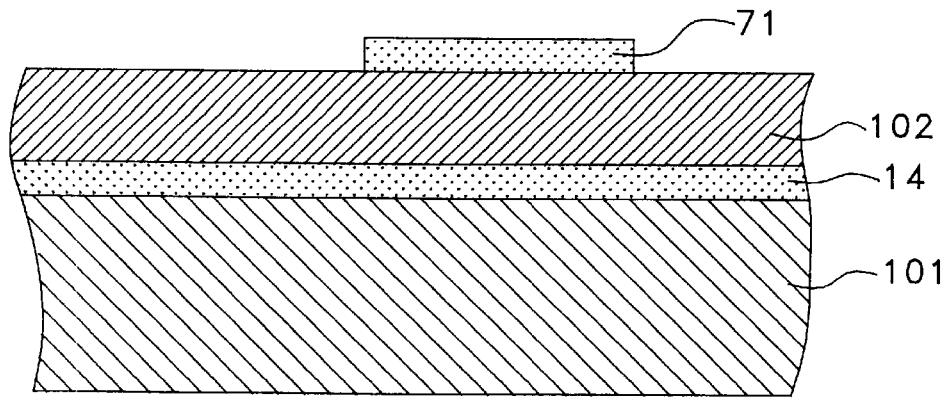
FIGS. 12(a), 12(b) and 12(c) are sectional views sequentially illustrating a method for producing a magnetic head suspension according to another embodiment of the invention.
Figure 12B:
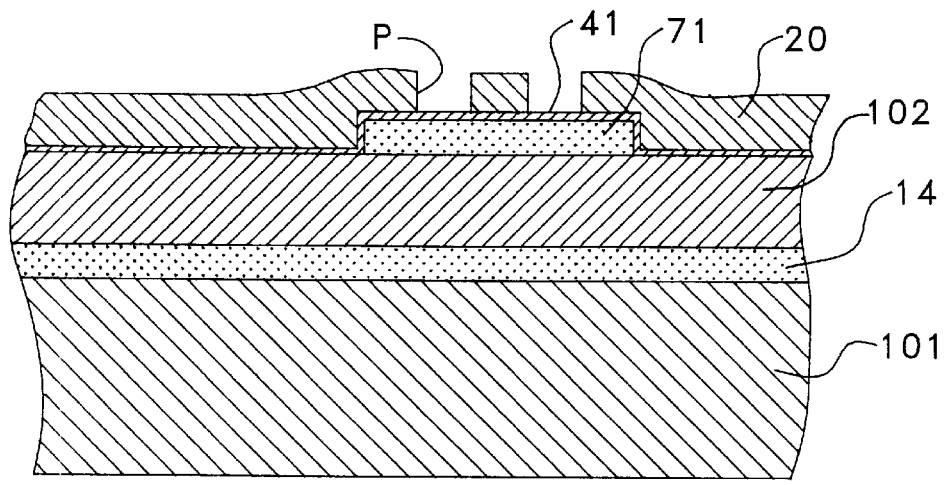
Figure 12C:
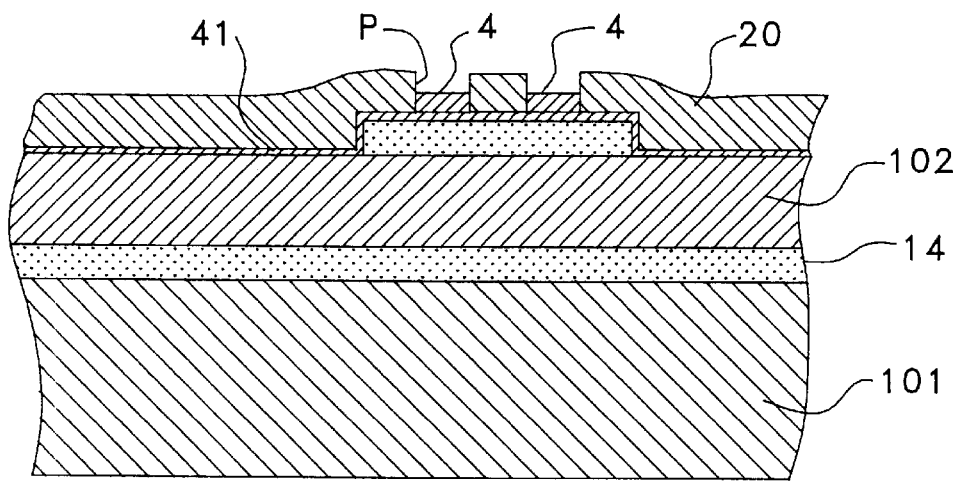
Figure 13:
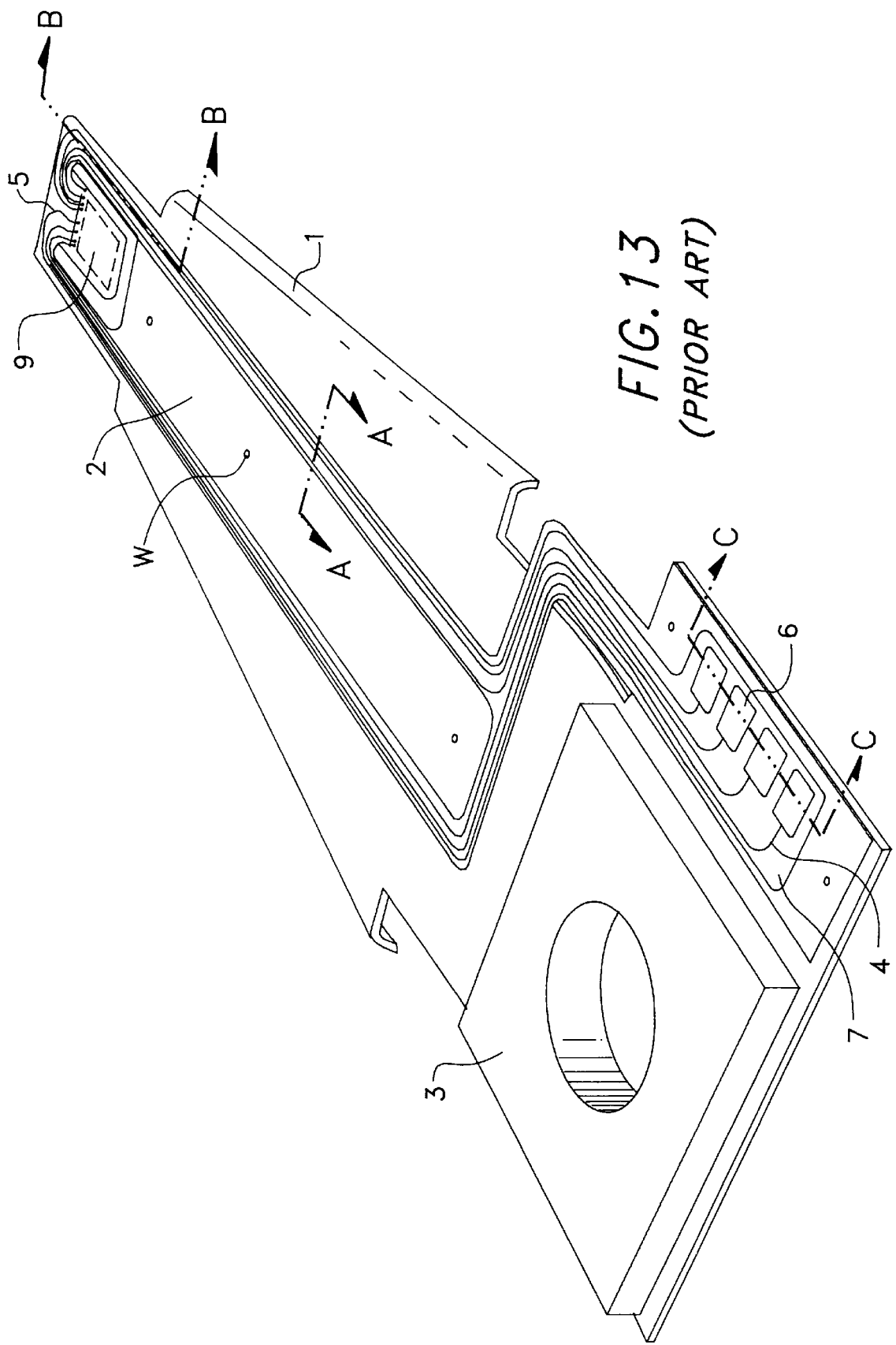
FIG. 13 is a perspective view illustrating a magnetic head suspension according to prior art.
Figure 14:
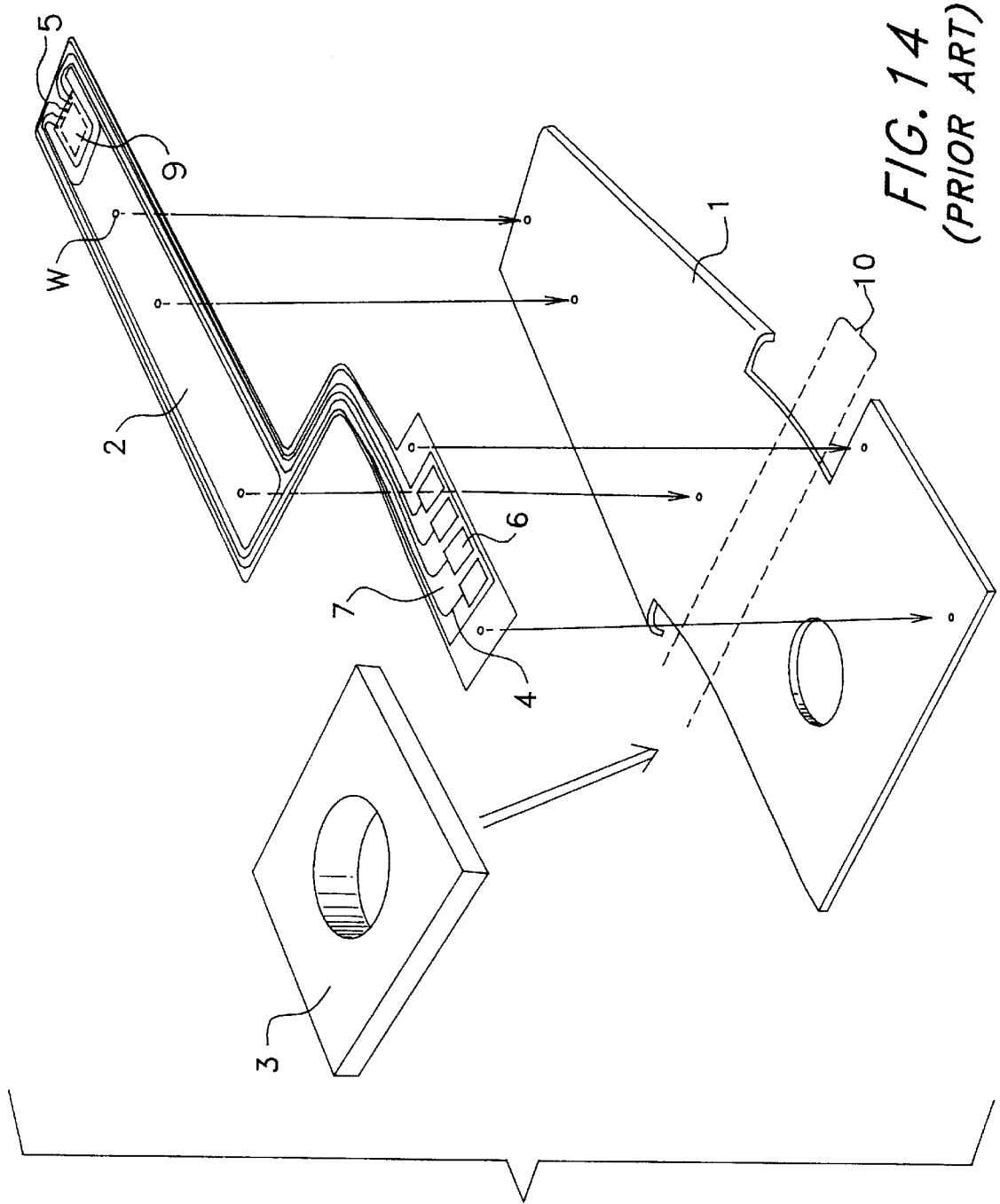
FIG. 14 is an exploded perspective view illustrating the magnetic head suspension shown in FIG. 13.
Figure 15A:
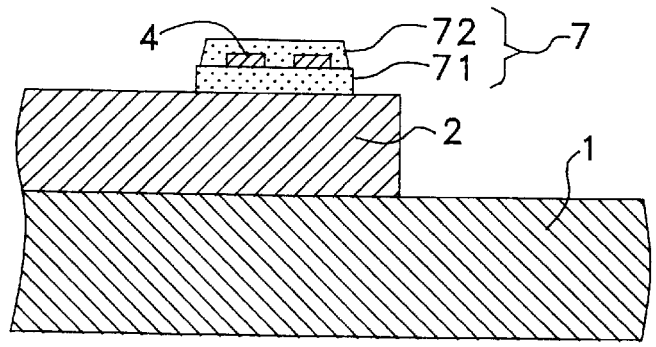
FIGS. 15(a), 15(b) and 15(c) are sectional views respectively along lines A—A, B—B and C—C in FIG. 13.
Figure 15B:
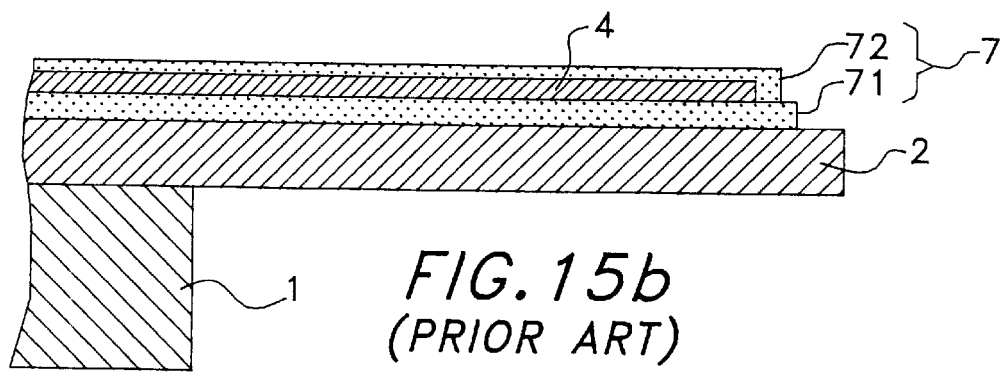
Figure 15C:
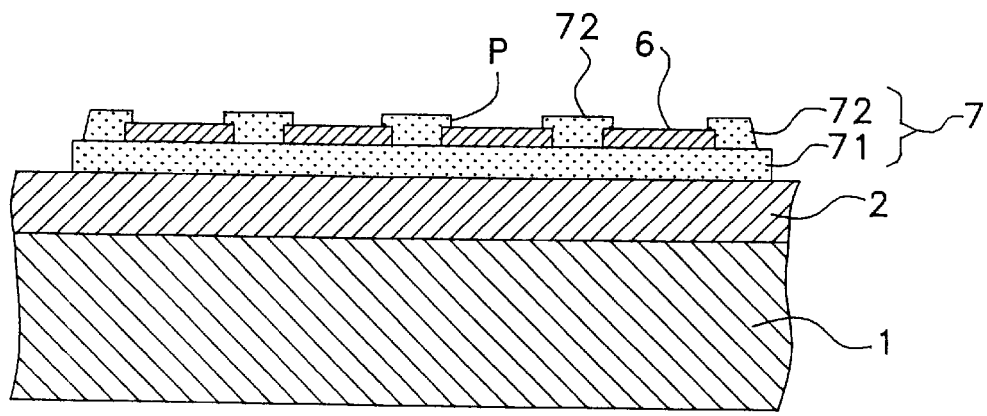
Figure 16A:
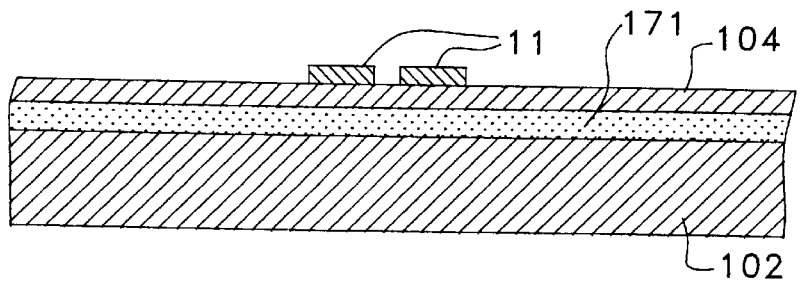
FIGS. 16(a), 16(b), 16(c), 16(d) and 16(e) are sectional views sequentially illustrating the steps of a method for producing the magnetic head suspension of FIG. 13.
Figure 16B:
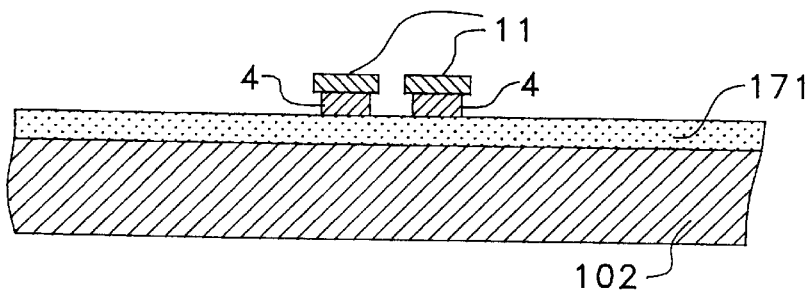
Figure 16C:
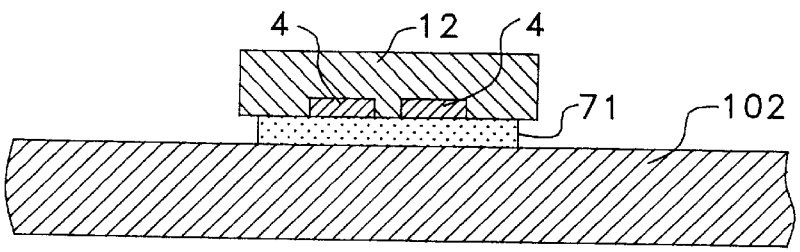
Figure 16D:
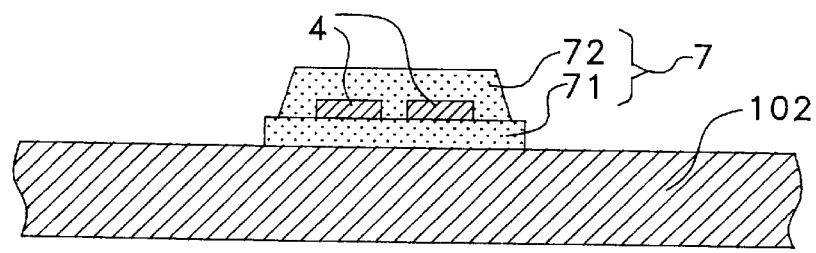
Figure 16E:
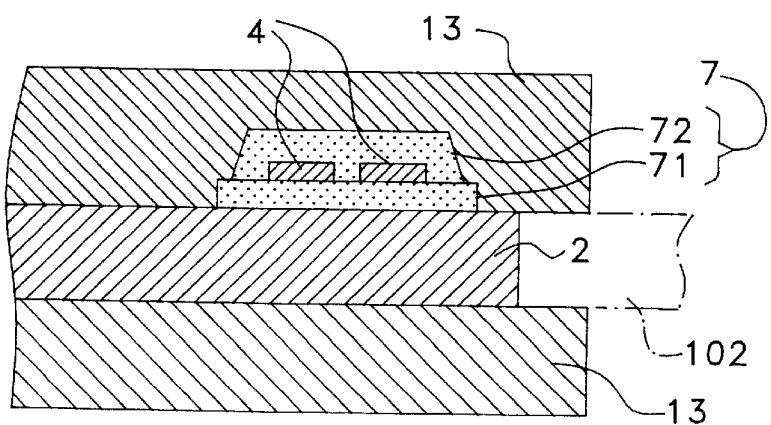

FIGS. 12(a) to (c) are sectional view sequentially showing each step of a method for forming the insulation layer and the wire leads. A bonding layer 14 of polyimide having a thickness of 5–15 micrometers, and a second metal plate 102 of stainless steel, having a thickness of 20–30 micrometers, for subsequently forming the flexure are sequentially laminated on the entire upper surface of a first metal plate 101 of a stainless steel plate, having a thickness of 60–70 micrometers, for subsequently forming the load beam. Thereafter, and as shown in FIG. 12(a), a layer of photosensitive polyimide is applied on the entire surface.

Then, exposure and development are performed, so that an insulation layer 71 of polyimide having a thickness of 5–10 micrometers is formed in the area of the second metal plate 102, including the region where the wiring arrangement is formed. Thereafter, a feeder layer 41 of a metal, such as Cu (copper), having a thickness of 0.1–1.0 micrometers is deposited on the entire upper surface of the metal plate 102, including the insulation layer 71 of polyimide, by means of sputtering or electroless plating. Then, a plating resist 20 is formed in the area excluding the region where wiring arrangement is formed, as shown in FIG. 12(*b*). Then, a Cu layer having 5–10 micrometers is deposited by means of electrolytic plating on the Cu feeder layer 41 at its area exposed to the opening P of the plating resist 20, so as to form wire leads 4, as shown in FIG. 12(*c*). Thereafter, the plating resist 20 is removed using an organic solvent, for example, and the feeder layer 41, excluding the area where wiring arrangement is formed, is etched away using the wire leads 4 as a mask. Since the wire leads 4 have a thickness several or several tenth greater than that of the feeder layer 41, only the feeder layer 41 may be etched away, although the wire leads 4 are slightly reduced in their thickness. Subsequently, the steps or processes exactly the same as those explained above in relation to FIGS. 7 to 11 will be repeated.

In order to place the flexure to be a ground potential, the flexure may be electrically connected to the load beam which is usually a ground potential. This may be achieved by forming a metal film in the area extending over the load beam and the flexure, for example, by means of electroless plating.

ADVANTAGES OF THE INVENTION

In accordance with the magnetic head suspension of the invention, the load beam and the flexure are bonded together by means of a bonding layer of a flexible resin, but not by means of welding. Thus, no strain is introduced into the flexure or the load beam, so that superior mechanical property of the flexure and the load beam may be stably maintained.

In accordance with the method for producing the magnetic head suspension of the invention, formation of the lead wires, formation of the polyimide layer, and the formation of the flexure are all performed on the first metal plate of a sufficient rigidity. Thus, deformation of the second metal plate, subsequently constituting the flexure, as seen in prior art, may be prevented. It is also noted that the metal plate in a flattened form may be passed through various processes, without requiring the metal plate to be wound around a roll. Accordingly, the problem of warping or bowing of the flexure, as experienced in prior art production method, may be eliminated. Thus, magnetic head suspensions of an increased mechanical property may be produced with a high yield efficiency. It is also noted that the production equipment may be simplified, so that production cost is reduced.

It will further be obvious to those skilled in the art that many variations may be made in the above embodiments, here chosen for the purpose of illustrating the present invention, and full result may be had to the doctrine of equivalents without departing from the scope of the present invention, as defined by the appended claims.

I claim:

1. A magnetic head suspension comprising:

a load beam having a predetermined rigidity;

a flexure bonded to one surface of said load beam through a bonding layer of a flexible resin, the flexure having a thickness less than that of the load beam and a rigidity less than that of the load beam wherein said bonding layer is present only within an area wherein said load beam and said flexure overlap;

an insulation layer of a flexible resin formed on the surface of the flexure opposite to the surface thereof to which the load beam is bonded to the flexure, the insulation layer extending in the direction from a proximal end to a distal end of the flexure; and a wiring arrangement formed on the insulation layer and connected to a magnetic head slider disposed at the distal portion of the flexure.

2. The magnetic head suspension of claim 1, wherein said load beam has a thickness of about 60 to 70 $\mu$m.

3. The magnetic head suspension of claim 1, wherein said flexure has a thickness of about 20 to 30 $\mu$m.

4. The magnetic head suspension of claim 1, wherein said bonding layer is a polyimide resin.

5. The magnetic head suspension of claim 1, wherein said bonding layer has a thickness of about 5 to 15 $\mu$m.

6. The magnetic head suspension of claim 1, wherein said insulation layer is a polyimide resin.

7. The magnetic head suspension of claim 1, wherein said insulation layer has a thickness of about 5 to 10 $\mu$m.

8. A magnetic head suspension comprising:

a load beam having a predetermined rigidity;

a flexure bonded to one surface of the load beam through a bonding layer of a flexible resin, the flexure having a thickness less than that of the load beam and a rigidity less than that of the load beam, wherein said bonding layer is present only within an area wherein said load beam and said flexure overlap;

an insulation layer of a flexible resin formed on the surface of the flexure opposite to the surface thereof to which the load beam is bonded to the flexure, the insulation layer extending in the direction from a proximal end to a distal end of the flexure;

a feed layer of metal formed on the insulation layer; and a wiring arrangement formed into a predetermined pattern on the feed layer by means of masking and electrolytic plating using the feed layer as an electrode, the wiring arrangement being connected to a magnetic head slider disposed at the distal end portion of the flexure.

* * * * *